United States Patent
Kawazoe

(10) Patent No.: US 8,094,210 B2
(45) Date of Patent: Jan. 10, 2012

(54) IMAGE SYNTHESIS APPARATUS, IMAGE PICKUP APPARATUS, IMAGE SYNTHESIS METHOD, AND PROGRAM

(75) Inventor: Daisuke Kawazoe, Kanagawa (JP)

(73) Assignee: Sony Corporation, Tokyo (JP)

( * ) Notice: Subject to any disclaimer, the term of this patent is extended or adjusted under 35 U.S.C. 154(b) by 358 days.

(21) Appl. No.: 12/435,854

(22) Filed: May 5, 2009

(65) Prior Publication Data

US 2009/0284617 A1      Nov. 19, 2009

(30) Foreign Application Priority Data

May 19, 2008   (JP) ................. 2008-131249

(51) Int. Cl.
*H04N 5/232* (2006.01)
(52) U.S. Cl. ..................... 348/229.1; 348/345
(58) Field of Classification Search ............... 348/229.1, 348/230.1, 234, 236, 222.1; 382/270, 274
See application file for complete search history.

(56) References Cited

U.S. PATENT DOCUMENTS

| 5,801,773 | A | 9/1998 | Ikeda | |
|---|---|---|---|---|
| 7,466,358 | B1 * | 12/2008 | Kusaka et al. | 348/362 |
| 7,502,067 | B2 * | 3/2009 | Kakinuma et al. | 348/371 |
| 7,525,579 | B2 * | 4/2009 | Katagiri | 348/234 |

FOREIGN PATENT DOCUMENTS

JP      07-131708      5/1995

* cited by examiner

*Primary Examiner* — Tuan Ho
(74) *Attorney, Agent, or Firm* — K&L Gates LLP

(57) ABSTRACT

An image synthesis apparatus is provided. The image synthesis apparatus includes a synthesis control block configured to determine a synthesized gain from a plurality of image signals having different exposure times, and a synthesis processing block configured to synthesize a plurality of image signals by use of a synthesized gain determined by the synthesis control block. In determining the synthesized gain, the synthesis control block references a predetermined predicted image signal ratio to exclude a domain of a pixel position having an image signal improper for the determination of a synthesized gain from a subject of the synthesized gain determination.

10 Claims, 8 Drawing Sheets

IMAGE SYNTHESIS APPARATUS, IMAGE PICKUP APPARATUS, IMAGE SYNTHESIS METHOD, AND PROGRAM

CROSS REFERENCES TO RELATED APPLICATIONS

The present application claims priority to that disclosed in Japanese Priority Patent Application JP 2008-131249, filed in the Japan Patent Office on May 19, 2008, the entire content of which is hereby incorporated by reference.

BACKGROUND

In taking a scene against light or taking a scene large in luminance difference, a white-out or black-out effect may occur only with a standard image with the exposure period matched with the illuminance of photographic subject.

In order to overcome this problem, two or more non-standard images having different exposure times are taken to be replaced by an image obtained by multiplying the non-standard images by a synthesis gain in the area too bright or too dark in the standard image to enlarge the dynamic range of the resultant image, which is then compressed in match with the output bit.

In this case, the standard image and the non-standard image are connected by synthesized gain, so that an improper synthesized gain may cause false contouring in the boundary of connection.

So, as disclosed in Japanese Patent Laid-open No. Hei 7-131708, the difference in photoelectric conversion and so on due to the difference in incident light intensity can be ignored by obtaining a synthesis gain to be multiplied by the non-standard image by a ratio between two image signals in the pixel of long/short replaced luminance level.

However, if a smear occurred in a backlight scene for example, false contouring is caused by the computation of an improper synthesized gain (FIG. 1).

Also, when a moving subject is taken, signals at the same pixel positions in two or more images are not always by the same subject. In this case, an improper image signal ratio is obtained, so that an improper synthesized gain is computed, resulting in false contouring.

SUMMARY

The present disclosure relates to an image synthesis apparatus, an image pickup apparatus, an image synthesis method, and a program that are configured to synthesize two or more images taken under different image pickup conditions.

Therefore, one embodiment addresses the above-identified and other problems associated with related-art methods and apparatuses and solves the addressed problems by providing an image synthesis apparatus, an image pickup apparatus, an image synthesis method, and a program that are configured to prevent the occurrence of false contouring due to the influence of smears, movement of subject, and so on.

According to a first embodiment, there is provided an image synthesis apparatus. This image synthesis apparatus has a synthesis control block configured to determine a synthesized gain from a plurality of image signals having different exposure times; and a synthesis processing block configured to synthesize a plurality of image signals by use of a synthesized gain determined by the synthesis control block. In this image synthesis apparatus, in determining the synthesized gain, the synthesis control block references a predetermined predicted image signal ratio to exclude a domain of a pixel position having an image signal improper for the determination of a synthesized gain from a subject of synthesized gain determination.

According to a second embodiment, there is provided an image pickup apparatus. This image pickup apparatus has an image pickup unit configured to continuously take a plurality of images having different exposure times; and an image synthesis unit configured to synthesize the plurality of images taken by the image pickup unit. In this image pickup apparatus, the image synthesis unit has a synthesis control block for determining a synthesized gain from a plurality of image signals having different exposure times taken by the image pickup unit and a synthesis processing block for synthesizing a plurality of image signals by use of the synthesized gain determined by the synthesis control block, and the synthesis control block, in determining the synthesized gain, references a predetermined predicted image signal ratio to exclude a domain of a pixel position having an image signal improper for the determination of a synthesized gain from a subject of synthesized gain determination.

Suitably, the above-mentioned synthesis control block computes a ratio of a signal level of a pixel having a signal level within a predicted error from a signal level of a replacement threshold in a properly exposed image.

Suitably, the above-mentioned synthesis control block predicts a predicted image signal ratio from a ratio of an exposure time to compute a synthesized gain by use of a signal ratio within a predicted error from the predicted image signal ratio.

According to a third embodiment, there is provided an image synthesis method. This image synthesis method has the steps of determining a synthesized gain from a plurality of image signals having different exposure times; and synthesizing a plurality of image signals by use of the synthesized gain determined in the synthesized gain determining step. In this image synthesis method, in the synthesized gain determining step, in determining the synthesized gain, a predetermined predicted image signal ratio is referenced to exclude a domain of a pixel position having an image signal improper for the determination of a synthesized gain from a subject of synthesized gain determination.

According to a fourth embodiment, there is provided a program configured to make a computer execute image synthesis processing. This image synthesis processing has the steps of determining a synthesized gain from a plurality of image signals having different exposure times; and synthesizing a plurality of image signals by use of the synthesized gain determined in the synthesized gain determining step. In this image synthesis processing, in the synthesized gain determining step, in determining the synthesized gain, a predetermined predicted image signal ratio is referenced to exclude a domain of a pixel position having an image signal improper for the determination of a synthesized gain from a subject of synthesized gain determination.

As described above, according to the embodiments, in determining a synthesized gain from two or more image signals having different exposure times, the image control block determines a proper predicted image signal ratio in advance. Then, the image control block references the predicted image signal ratio to exclude a domain of a pixel position having an image signal improper for the determination of a synthesized gain from a subject of synthesized gain determination.

According to the embodiments, the occurrence of false contouring due to the influence of smear can be suppressed.

Additional features and advantages are described herein, and will be apparent from the following Detailed Description and the figures.

DETAILED DESCRIPTION

The present application will be described in further detail by way of embodiments thereof with reference to the accompanying drawings.

Figure 1:
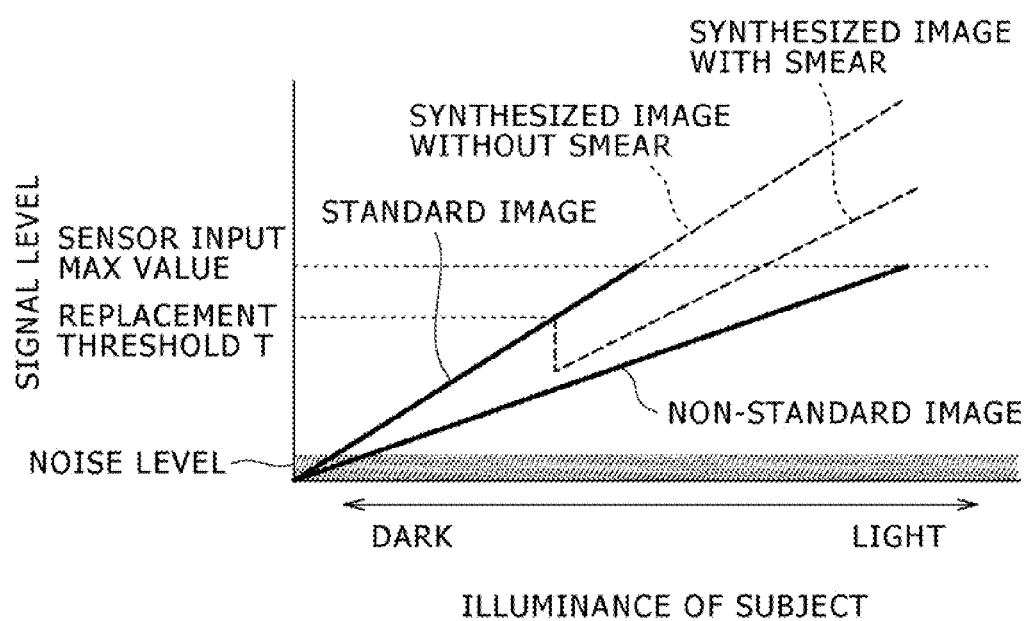
FIG. 1 is a graph indicative of the occurrence of false contouring due to the occurrence of a smear.
Figure 2:
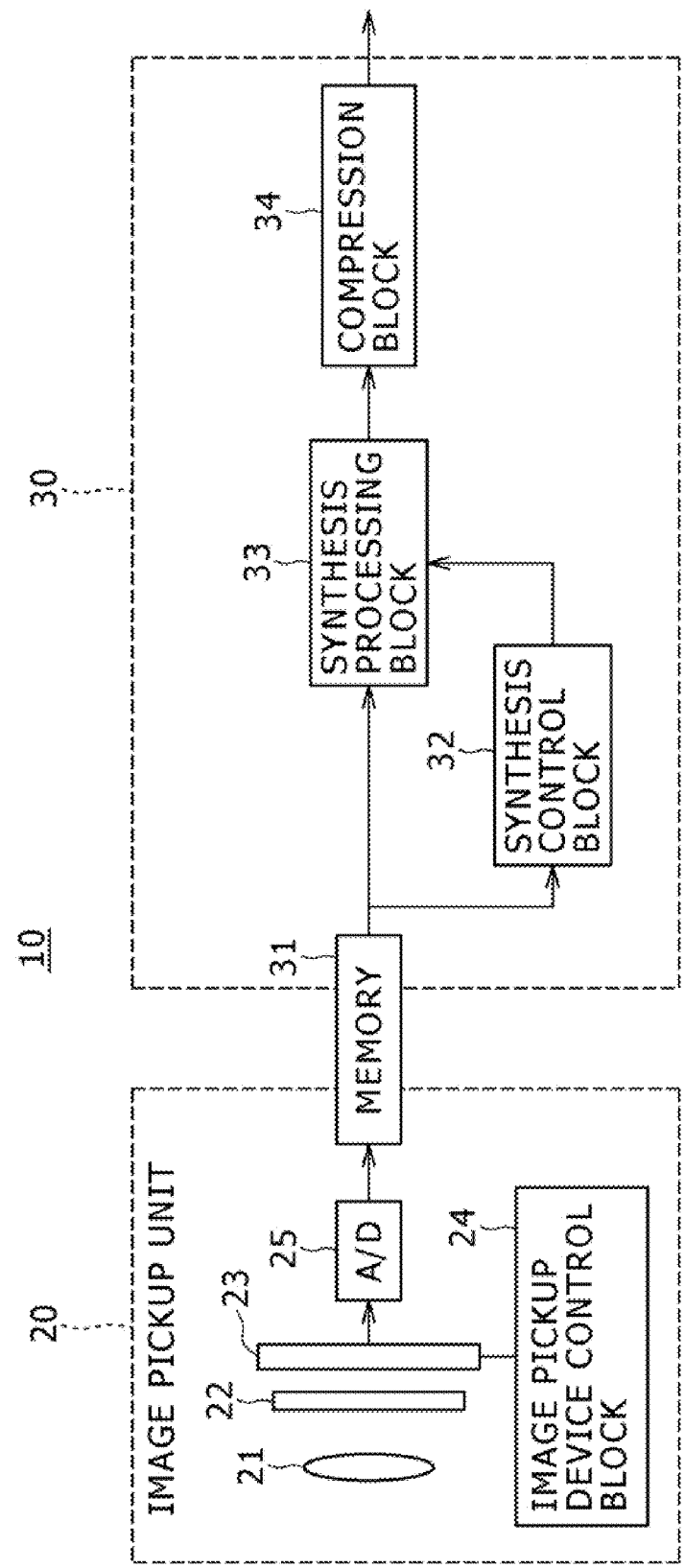
FIG. 2 is a schematic diagram illustrating an exemplary configuration of an image pickup apparatus to which an image synthesis apparatus practiced as one embodiment is applied.

Now, referring to FIG. 2, there is shown an exemplary configuration of an image pickup apparatus to which an image synthesis apparatus practiced as one embodiment is applied.

In the image synthesis apparatus associated with the above-mentioned embodiment, a proper predicted image signal ratio is determined beforehand when determining a synthesized gain from two or more image signals having different exposure times. The image synthesis apparatus is configured to suppress the occurrence of false contouring by excluding from the synthesized gain determination portion the domain of pixel positions having an image signal improper for the synthesized gain determination portion by referencing the predicted image signal ratio.

This image pickup apparatus 10 has an image pickup unit 20 and an image synthesis unit 30.

The image pickup unit 20 has a lens 21, an optical lowpass filter 22, an image pickup device 23, an image pickup device control block 24, and an analog-to-digital (A/D) converter 25.

The image synthesis unit 30 has a memory 31, a synthesis control block 32, a synthesis processing block 33, and a compression block 34.

It should be noted that here the memory is a member of the image synthesis unit 30; However, the memory may only be accessed from the image synthesis unit 30, so that the memory may be arranged on the side of the image pickup unit 20 or between the image pickup unit 20 and the image synthesis unit 30, for example.

In the image pickup unit 20, a photographic subject image is projected to the image pickup surface of the image pickup device 23 from the lens 21 through the optical lowpass filter 22. The image pickup device 23 is made up of a charge coupled device (CCD) sensor or a complementary metal oxide semiconductor (CMOS) sensor.

The image pickup device control block 24 is configured to execute control the image pickup device 23 such that two or more images having different exposures are taken at one image pickup operation.

In the present embodiment, two image signals are taken; a standard image signal having white-out taken with a proper exposure and a non-standard image signal having black-out taken in a relatively short time. The taken image signals are converted by the A/D converter 25 into digital signals to be recorded to the memory 31.

The synthesis control block 32 determines synthesized gain G and replacement threshold level T for image synthesis by referencing the image signal recorded to the memory 31. The specific processing for determining synthesized gain G and replacement threshold level T by the synthesis control block 32 will be detailed later. The synthesis control block 32 supplies the determined synthesized gain G and replacement threshold level T to the synthesis processing block 33.

The synthesis processing block 33 synthesizes standard image signal SIM with non-standard image signal NSIM recorded to the memory 31 by use of the synthesized gain G and the replacement threshold level T supplied from the synthesis control block 32. Then, the synthesis processing block 33 supplies the resultant synthesized image to the compression block 34.

The compression block 34 compresses the image synthesized by the synthesis processing block 33 and outputs the resultant compressed image.

The following further details the configuration and functions of the synthesis control block 32.

Figure 3:
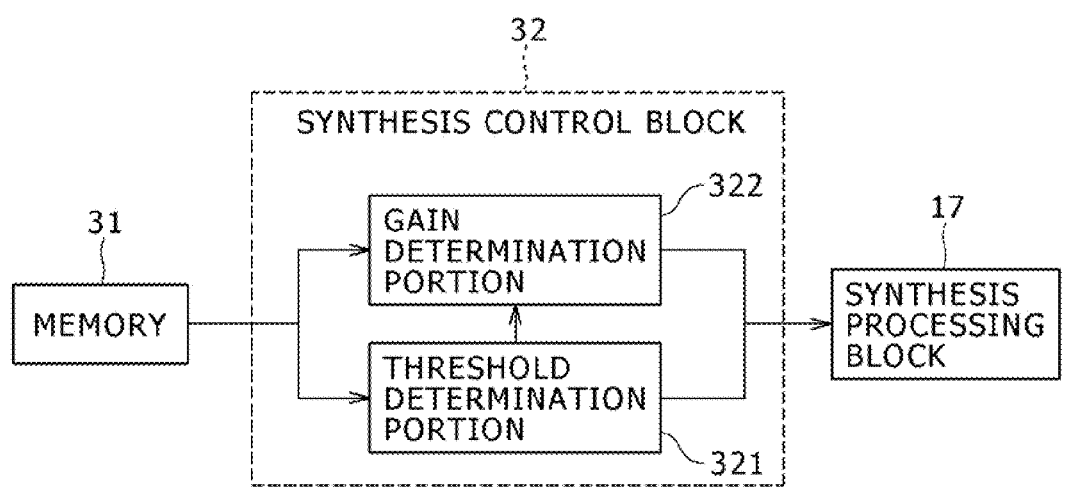
FIG. 3 is a block diagram illustrating an exemplary configuration of a synthesis control block associated with the above-mentioned embodiment.

Referring to FIG. 3, there shown a block diagram of an exemplary configuration of the synthesis control block 32 associated with the present embodiment.

The synthesis control block 32 has the function of determining long/short replacement threshold level T and synthesized gain G that are referenced by the synthesis processing block 33 as described above.

The synthesis control block 32 is made up of a threshold determination portion 321 and a gain determination portion 322 a shown in FIG. 3.

The threshold determination portion 321 reads standard image signal SIM and non-standard image signal NSIM from the memory 31 and references these signals to determine long/short replacement threshold level T. The threshold determination portion 321 supplies the determined long/short replacement threshold level T to the gain determination portion 322 and the synthesis processing block 33.

It should be noted that long/short replacement threshold level may be either constant regardless of the image signal or the histogram of the image signal.

The gain determination portion 322 adds standard image signal SIM and non-standard image signal NSIM read from the memory 31 and referenced and reference long/short replacement threshold level T supplied from the threshold determination portion 321 to determine synthesized gain G in long/short replacement threshold level T, supplying the determined synthesized gain G to the synthesis processing block 33.

Figure 4:
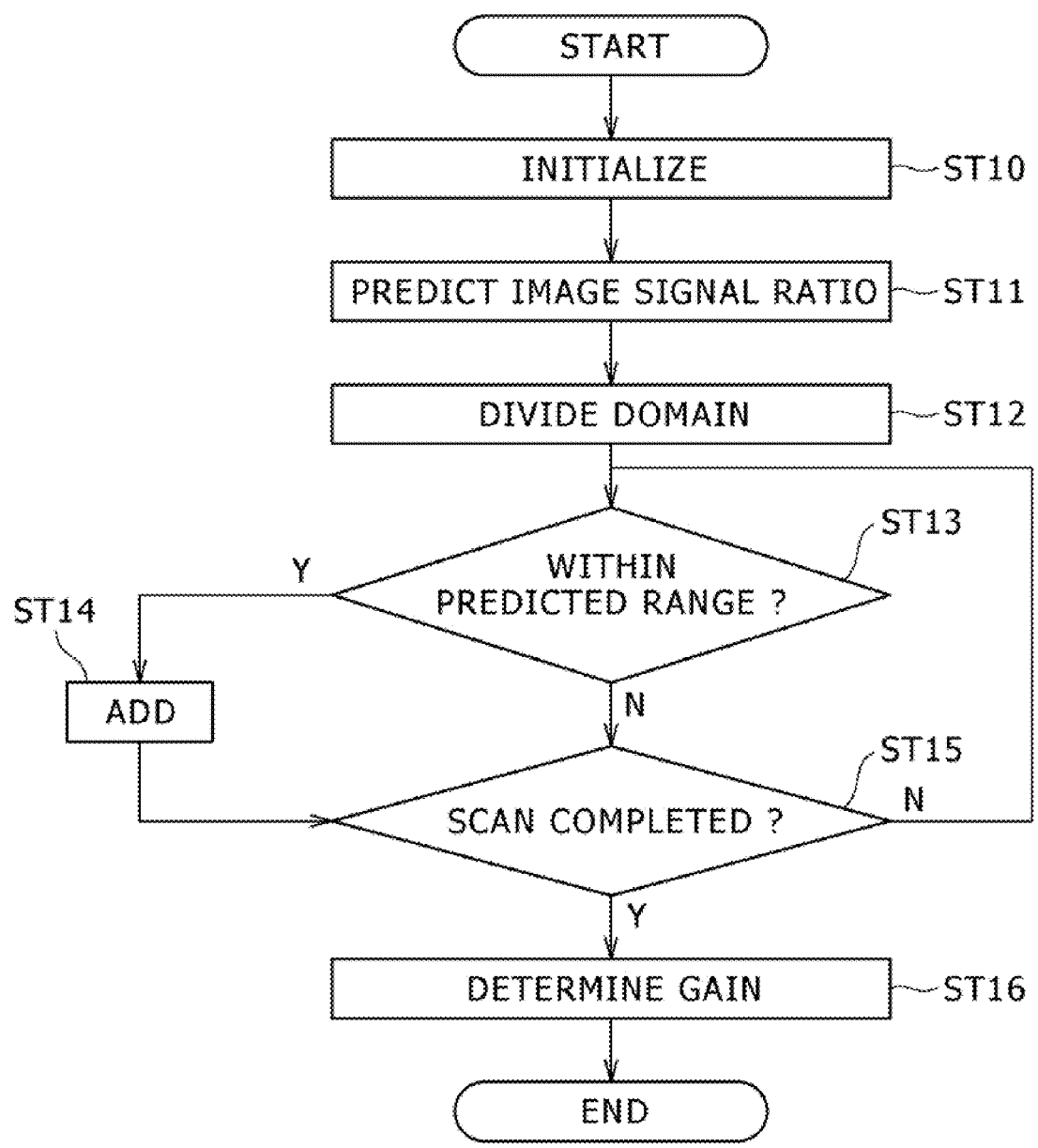
FIG. 4 is a flowchart indicative of a gain determination procedure that is not affected by the influence of smear or the like by a gain determination portion associated with the above-mentioned embodiment.

Referring to FIG. 4, there is shown a flowchart indicative of a gain determination procedure that is not affected by smears or the like to be executed by the gain determination portion 322.

The following describes the gain determination procedure that is not affected by smears or the like to be executed by the gain determination portion 322, with reference to the flowchart shown in FIG. 4.

<Step ST10>

In step ST10, the gain determination portion 322 reads a standard image signal and a non-standard image signal from the memory 31 to initialize sum1 and sum2 to be used in the add processing of step ST14.

<Step ST11>

In step ST11, the gain determination portion 322 predicts predicted image signal ratio $G_P$ of the standard image signal and the non-standard image signal at long/short replacement threshold level T.

In a specific method of predicting predicted image signal ratio $G_P$, predicted image signal ratio $G_P$ is computed from a lookup table (LUT) with exposure times of standard image signal SIM and non-standard image signal NSIM used as arguments, for example. The LUT is created by computing an average of image signal ratios from two or more reference images having no smear.

In the case of continuous frame processing, such as moving images, it is also practicable to reference synthesized gain G of the preceding frame or estimate predicted image signal ratio $G_P$ from the difference in intensity of incident light and the characteristic of photoelectric conversion efficiency, for example. At this moment, predicted error $TH_B$ of predicted image signal ratio $G_P$ is also determined.

<Step ST12>

In step ST12, the gain determination portion 322 references long/short replacement threshold level T determined by the threshold determination portion 321 to divide the domain of long/short replacement threshold level T from the standard image signal. If the resultant domain is smaller than an allowable value, the domain of long/short replacement threshold level $\pm TH_A$ is divided.

$TH_A$ may be constant regardless of the image signal or the value of $TH_A$ may be increased until the domain to be divided exceeds the allowable value.

<Step ST13>

In step ST13, the gain determination portion 322 references the standard image signal and the non-standard image signal that correspond to the pixel position of the domain obtained in step ST12 to compute an image signal ratio from the ratio of each signal level. If the computed image signal ratio is included in the range of predicted error $TH_B$ of predicted image signal ratio $G_P$ predicted in step ST11, the procedure goes to step ST14; otherwise, the procedure goes to step ST15.

Alternatively, the gain determination portion 322 may reference the non-standard image signal corresponding to the pixel position of the domain obtained in step ST12 to determine whether the computed image signal ratio is included in the range of non-standard image signal corresponding to the range of image signal ratio $G_P$ and predicted error $TH_B$ predicted in step ST11.

Figure 5:
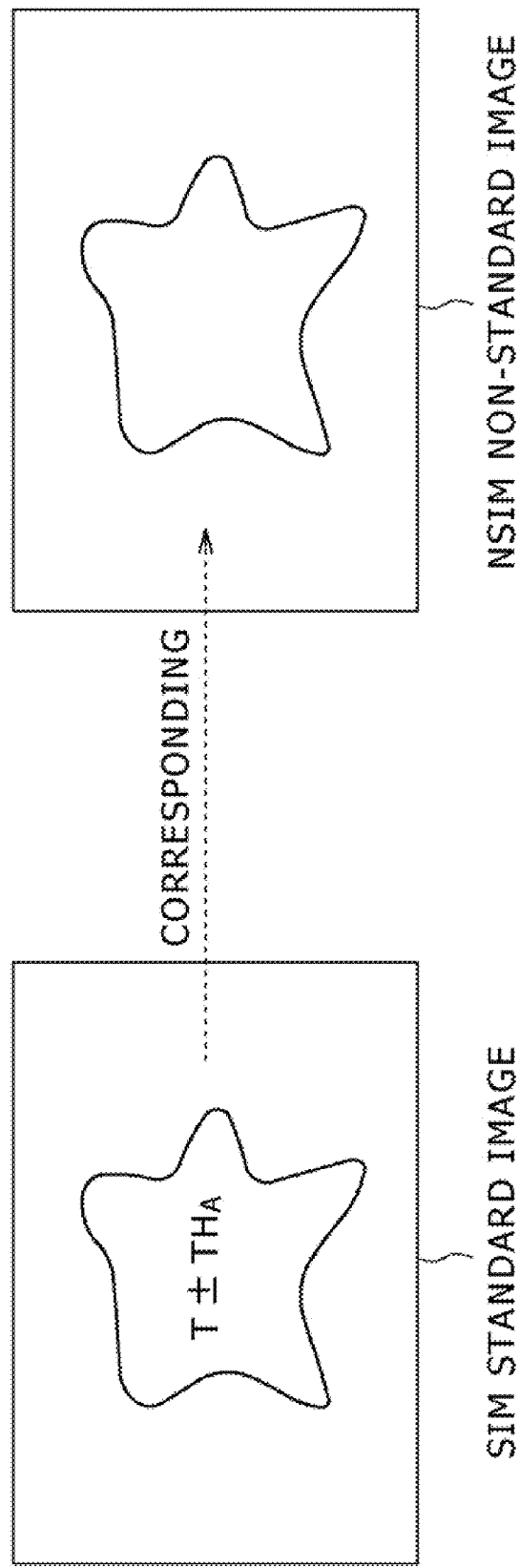
FIG. 5 is a schematic diagram illustrating a correlation between a standard image and a non-standard image.
Figure 6:
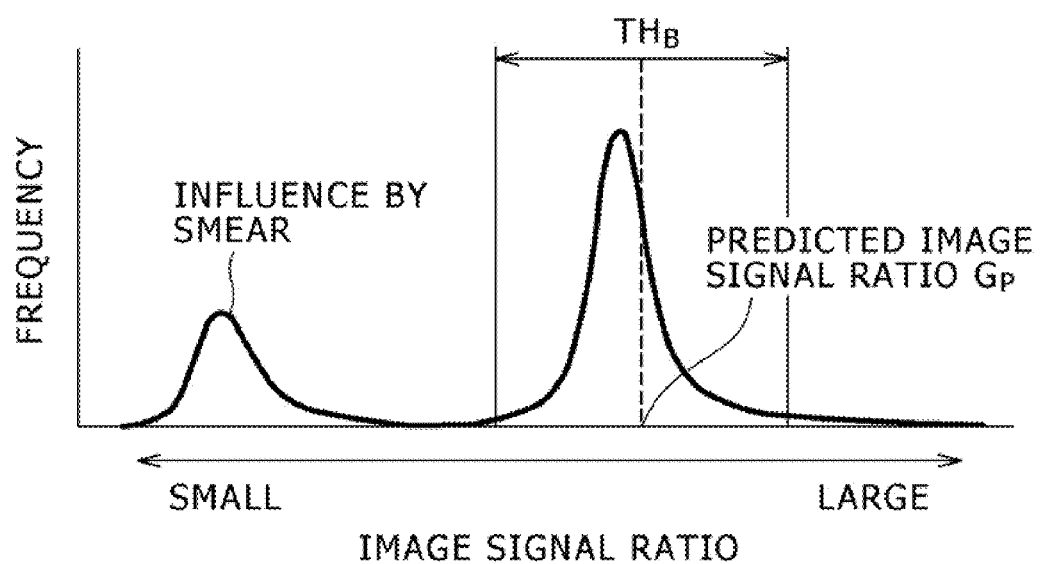
FIG. 6 is a graph indicative of an exemplary histogram of an image signal ratio in divided domains.

FIG. 5 and FIG. 6 schematically show step ST12 and step ST13 by way of examples. FIG. 5 schematically shows a correlation between standard image signal SIM and non-standard image signal NSIM. FIG. 6 shows an example of a histogram of the image signal ratios in the domain obtained by division.

In the present embodiment, the ratio of the signal level of a pixel having a signal level matching $\pm H_A$ is computed from the signal level of replacement threshold level T in a properly exposed image. As shown in FIG. 6, predicted image signal ratio $G_P$ is empirically predicted from the ratio of exposure time and a synthesized gain is computed by use of a signal ratio within $\pm TH_B$ from predicted image signal ratio $G_P$.

Since the image signal ratio takes a value that is largely different from the original ratio due to smear, any image signal ratios affected by smear are excluded, thereby realizing a wide dynamic range without causing the false contouring due to smear even with a scene containing smear. In addition, the influences of moving subjects and noise other than smear can also be ignored in the same manner.

Figure 7:
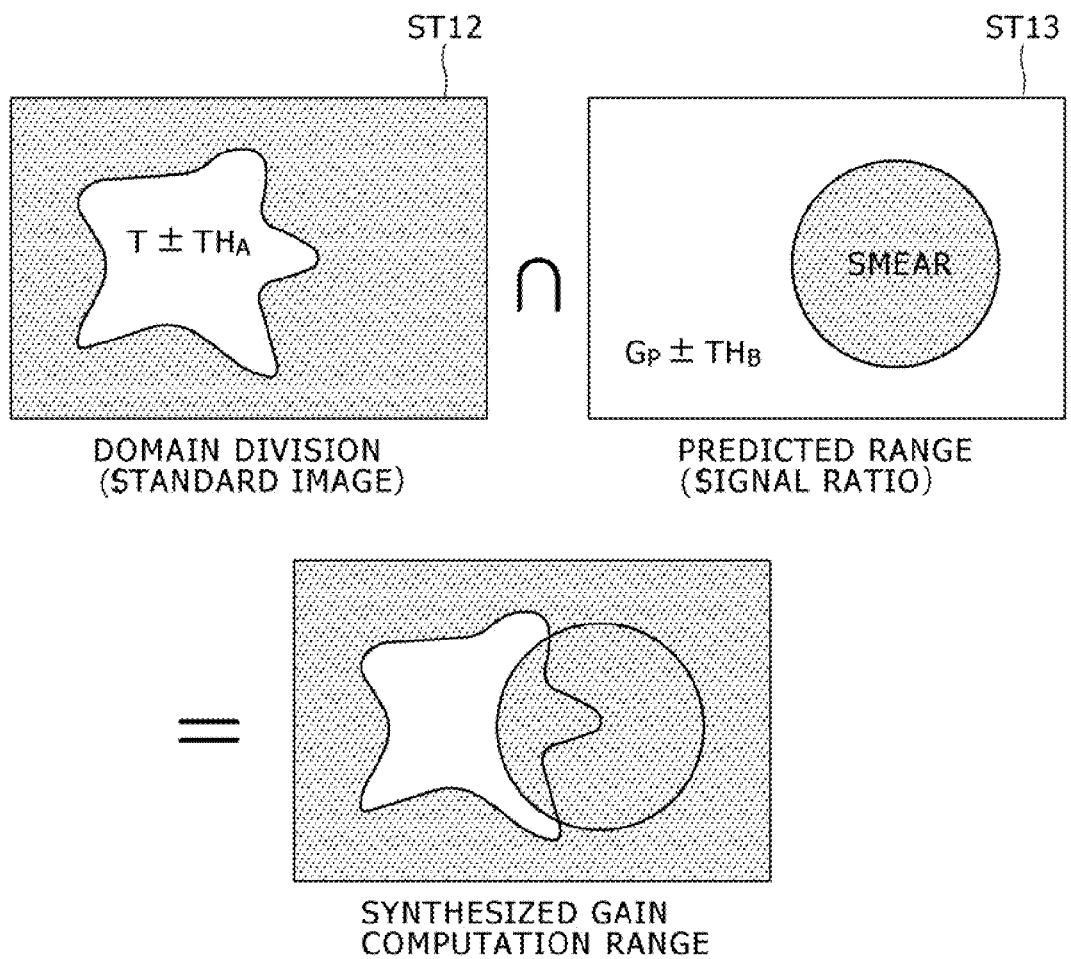
FIG. 7 is a diagram illustrating a first specific example of a flow up to synthesized gain computations in step ST12 and step ST13 shown in FIG. 4.

FIG. 7 shows a first specific example of a flow of processing up to the computation of synthesized gain in steps ST12 and ST13.

In this example, the domain of long/short replacement threshold level $T \pm TH_A$ is divided in step ST12 a shown in FIG. 7. In step ST13, it is determined whether the image signal ratio falls within the range of predicted image signal ratio $G_P \pm TH_B$. The range included in both domains provides a domain that is used for the computation of synthesized gain.

Figure 8:
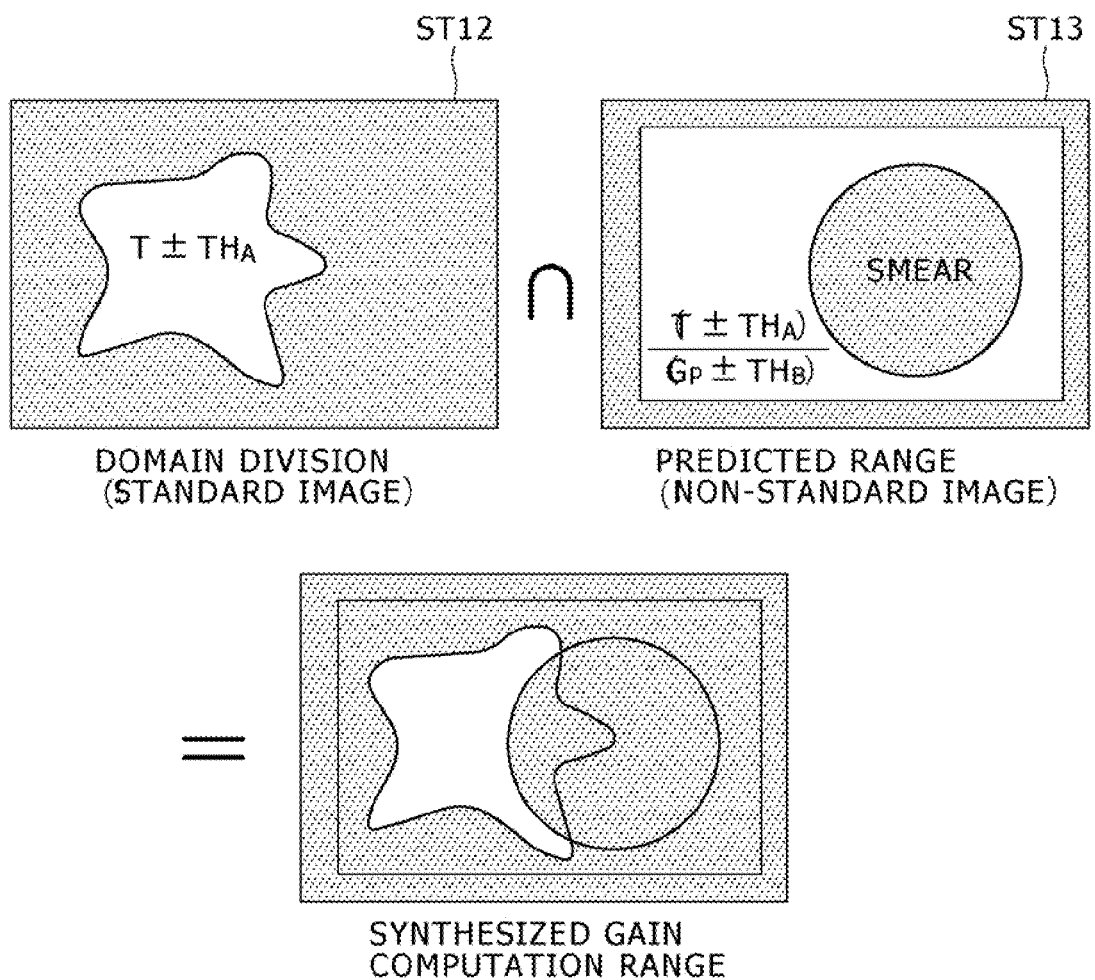
FIG. 8 is a diagram illustrating a second specific example of a flow up to synthesized gain computations in step ST12 and step ST13 shown in FIG. 4.

FIG. 8 shows a second specific example of a flow up to the computation of synthesized gain in steps ST12 and ST13.

In this example, the domain of long/short replacement threshold level $T \pm TH_A$ is divided in step ST12 as shown in FIG. 8. In step ST13, it is determined whether the image signal ratio falls within the range of $(T \pm TH_A)/(G_P \pm TH_B)$ with the non-standard image in step ST13. Then, the range included in both domains provides a domain that is used for the computation of synthesized gain.

<Step ST14>

In step ST14, the gain determination portion 322 adds the standard image signal level at the pixel position referenced in step ST13 to sum1 and the non-standard image signal level to sum2, upon which the procedure goes to step ST15. Alternatively, the gain determination portion 322 may add the ratios of the standard image signal and non-standard image signal at the pixel position referenced in step ST13 and store the number of times the addition was made.

<Step ST15>

In step ST15, the gain determination portion 322 determines whether the processing of step ST13 has been executed on the pixel position inside the domain obtained in step ST12. If the processing of step ST13 has been executed on all pixel positions, then the procedure goes to step ST16. Otherwise, the procedure goes to step ST13 at each unprocessed pixel position.

<Step ST16>

In step ST16, the gain determination portion 322 determines synthesized gain G to be supplied to the synthesis processing block 33. Synthesized gain G is determined by the gain determination portion 322 from the ratio between sum1 and sum2 added in step ST14.

The following describes operations that are executed in the configuration shown in FIG. 2.

In the image pickup unit 20, a subject image is projected to the image pickup surface of the image pickup device 23 from the lens 21 through the optical lowpass filter 22. The image pickup device 23 is made up of a CCD or CMOS sensor.

The image pickup device control block 24 is configured to execute control the image pickup device 23 such that two or more images having different exposures are taken at one image pickup operation. In the present embodiment, two image signals are taken; a standard image signal having white-out taken with a proper exposure and a non-standard image signal having black-out taken in a relatively short time. The taken image signals are converted by the A/D converter 25 into digital signals to be recorded to the memory 31. Next, referencing the information in the memory 31, the synthesis control block 32 determines synthesized gain G and replacement threshold level T. Then, on the basis of these values, the standard image signal and the non-standard image signal are synthesized by the synthesis processing block 33 to be compressed by the compression block 34, the compressed synthesized signal being outputted.

As described above, according to the present embodiment, the ratio of signal levels of pixels having signal levels matching $\pm TH_A$ from the signal level of replacement threshold T in a properly exposed image. Predicted image signal ratio $G_P$ is empirically predicted from the ratio of exposure time and a synthesized gain is computed by use of a signal ratio within $\pm TH_B$ from predicted image signal ratio $G_P$.

Since the image signal ratio takes a value that is largely different from the original ratio due to smear, any image signal ratios affected by smear are excluded, thereby realizing a wide dynamic range without causing the false contouring due to smear even with a scene containing smear. In addition, the influences of moving subjects and noise other than smear can also be ignored in the same manner.

It should be noted that the method described in detail above may be formed as a software program corresponding to the above-mentioned procedure, the software program being executed by a computer, such as a processor or CPU, for example. Such a software program may be configured to be executed from recording media including a semiconductor memory, a magnetic disk, and an optical disk, a floppy disk (registered trademark) in which this software program is stored, such storage media being set to a computer that accesses these storage media.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image synthesis apparatus comprising:
    a synthesis control block configured to determine a synthesized gain from a plurality of image signals having different exposure times; and
    a synthesis processing block configured to synthesize the plurality of image signals by use of the synthesized gain determined by the synthesis control block, wherein,
    in determining the synthesized gain, the synthesis control block references a predetermined predicted image signal ratio to exclude a domain of a pixel position having an image signal improper for the determination of a synthesized gain from a subject of the synthesized gain determination.

2. The image synthesis apparatus according to claim 1, wherein the synthesis control block computes a ratio of a signal level of a pixel having a signal level within a predicted error from a signal level of a replacement threshold in a properly exposed image.

3. The image synthesis apparatus according to claim 2, wherein the synthesis control block predicts a predicted image signal ratio from a ratio of exposure time to compute a synthesized gain by use of a signal ratio within a predicted error from the predicted image signal ratio.

4. An image pickup apparatus comprising:
    an image pickup unit configured to continuously take a plurality of images having different exposure times; and
    an image synthesis unit configured to synthesize the plurality of images taken by the image pickup unit, wherein the image synthesis unit includes
    a synthesis control block for determining a synthesized gain from a plurality of image signals having different exposure times taken by the image pickup unit and
    a synthesis processing block for synthesizing the plurality of image signals by use of the synthesized gain determined by the synthesis control block, and
    the synthesis control block, in determining the synthesized gain, references a predetermined predicted image signal ratio to exclude a domain of a pixel position having an image signal improper for the determination of a synthesized gain from a subject of synthesized gain determination.

5. The image pickup apparatus according to claim 4, wherein the synthesis control block computes a ratio of a signal level of a pixel having a signal level within a predicted error from a signal level of a replacement threshold in a properly exposed image.

6. The image pickup apparatus according to claim 5, wherein the synthesis control block predicts a predicted image signal ratio from a ratio of an exposure time to compute a synthesized gain by use of a signal ratio within a predicted error from the predicted image signal ratio.

7. An image synthesis method comprising:
    determining by an image synthesis apparatus a synthesized gain from a plurality of image signals having different exposure times; and
    synthesizing by the image synthesis apparatus the plurality of image signals by use of the determined synthesized gain, wherein,
    in the synthesized gain determining step, in determining the synthesized gain, a predetermined predicted image signal ratio is referenced to exclude a domain of a pixel position having an image signal improper for the determination of a synthesized gain from a subject of the synthesized gain determination.

8. A computer program product stored on a computer-readable medium including executable instructions that when executed by a processor execute steps for image synthesis processing, the steps comprising:
    determining a synthesized gain from a plurality of image signals having different exposure times; and
    synthesizing a plurality of image signals by use of the determined synthesized gain, wherein,
    in the synthesized gain determining step, in determining the synthesized gain, a predetermined predicted image signal ratio is referenced to exclude a domain of a pixel position having an image signal improper for the determination of a synthesized gain from a subject of the synthesized gain determination.

9. An image synthesis apparatus comprising:
    synthesis control means for determining a synthesized gain from a plurality of image signals having different exposure times; and
    synthesis processing means for synthesizing a plurality of image signals by use of a synthesized gain determined by the synthesis control means, wherein,
    in determining the synthesized gain, the synthesis control means references a predetermined predicted image signal ratio to exclude a domain of a pixel position having an image signal improper for the determination of a synthesized gain from a subject of the synthesized gain determination.

10. An image pickup apparatus comprising:
    image pickup means for continuously taking a plurality of images having different exposure times; and
    image synthesis means for synthesizing the plurality of images taken by the image pickup means, wherein the image synthesis means includes synthesis control means for determining a synthesized gain from a plurality of image signals having different exposure times taken by the image pickup means and synthesis processing means for synthesizing the plurality of image signals by use of the determined synthesized gain, and the synthesis control means, in determining the synthesized gain, references a predetermined predicted image signal ratio to exclude a domain of a pixel position having an image signal improper for the determination of a synthesized gain from a subject of the synthesized gain determination.

* * * * *